(12) United States Patent
Yoshida

(10) Patent No.: US 9,908,415 B2
(45) Date of Patent: Mar. 6, 2018

(54) VEHICLE ONBOARD DISPLAY DEVICE

(71) Applicant: Panasonic Liquid Crystal Display Co., Ltd., Hyogo (JP)

(72) Inventor: Masahiro Yoshida, Osaka (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 27 days.

(21) Appl. No.: 15/060,600

(22) Filed: Mar. 4, 2016

(65) Prior Publication Data

US 2017/0253123 A1 Sep. 7, 2017

(51) Int. Cl.
*G06F 19/00* (2011.01)
*B60K 37/02* (2006.01)

(52) U.S. Cl.
CPC ...... *B60K 37/02* (2013.01); *B60K 2350/2008* (2013.01); *B60K 2350/2013* (2013.01); *B60K 2350/2069* (2013.01); *B60K 2350/352* (2013.01); *B60K 2350/405* (2013.01)

(58) Field of Classification Search
CPC .... B60K 2350/1024; B60K 2350/1028; B60K 37/06; B60K 2350/102; B60K 2350/104; G02B 2027/0138; G02B 2027/014; G02B 2027/0154; G02B 27/01; G02B 27/0179; B60R 1/00; G06F 3/04883; G06F 3/041; H04M 1/0266

USPC ................... 701/49, 31.4; 382/103
See application file for complete search history.

(56) References Cited

U.S. PATENT DOCUMENTS

| | | | | |
|---|---|---|---|---|
| 6,806,848 | B2* | 10/2004 | Hirao | B60K 35/00 250/206.1 |
| 2007/0296874 | A1* | 12/2007 | Yoshimoto | G09G 3/003 348/739 |
| 2009/0096937 | A1* | 4/2009 | Bauer | B60R 1/12 348/739 |
| 2010/0295670 | A1* | 11/2010 | Sato | B60Q 9/00 340/458 |
| 2015/0234459 | A1* | 8/2015 | George-Svahn | G06F 3/013 345/156 |
| 2016/0121805 | A1* | 5/2016 | Forsgren | B60R 11/0235 348/837 |

FOREIGN PATENT DOCUMENTS

JP H05-224170 A 9/1993
JP 2008-039927 A 2/2008

* cited by examiner

*Primary Examiner* — Dalena Tran
(74) *Attorney, Agent, or Firm* — Hubbs, Enatsky & Inoue PLLC

(57) ABSTRACT

Provided is a vehicle onboard display device, which is to be installed on a vehicle, and configured to cause, when a detection unit detects a predetermined operation, a movable mechanism to operate so as to direct a display panel toward a predetermined direction, and cause the display panel to display an image at a predetermined brightness.

14 Claims, 6 Drawing Sheets

FIG.3

| FIRST OPERATION | SECOND OPERATION |
|---|---|
| ENGINE START | UNLOCKING |
| D RANGE POSITION | DOOR OPENING |
| R RANGE POSITION | USER APPROACH |

FIG.4

|  | ATTITUDE | COLOR | BRIGHTNESS | BACKLIGHT BRIGHTNESS |
|---|---|---|---|---|
| FIRST MODE | (x0,y0,z0) | - | - | - |
| SECOND MODE | (x2,y2,z2) | WHITE | max | max |

FIG.7

| USER | AUTHENTICATION INFORMATION | MODE | OPERATION CONDITION | DISPLAY SETTING | | | |
|---|---|---|---|---|---|---|---|
| | | | | ATTITUDE | COLOR | BRIGHTNESS | BACKLIGHT BRIGHTNESS |
| USER A | KEY 1, FACE IMAGE A | FIRST MODE | ENGINE START | (x0,y0,z0) | - | - | - |
| | | SECOND MODE | UNLOCKING | (x2,y2,z2) | WHITE | Max | Max |
| USER B | KEY 2, FACE IMAGE B | FIRST MODE | D RANGE POSITION | (x3,y3,z3) | - | - | - |
| | | SECOND MODE | UNLOCKING | (x4,y4,z4) | BLUE | Max | Max |

VEHICLE ONBOARD DISPLAY DEVICE

BACKGROUND

1. Technical Field

The present application relates to a vehicle onboard display device.

2. Description of the Related Art

There has been known a technology of causing a vehicle onboard image display device configured to provide various types of information such as navigation to radiate light at a predetermined brightness, thereby using the vehicle onboard image display device as an illumination device. For example, in Japanese Patent Application Laid-open No. 2008-39927, there is disclosed a technology of causing an image display device to operate as an illumination device depending on user input information. Moreover, in Japanese Patent Application Laid-open No. Hei 5-224170, there is disclosed a technology of causing a liquid crystal display to operate as an illumination device when a screen of the liquid crystal display is directed downward.

SUMMARY

A vehicle onboard illumination device is desired to radiate light in a direction depending on a state, for example, irradiate the feet of an occupant when the an occupant is getting in or out of a vehicle. However, for a vehicle onboard display device such as a display device for navigation or an electronic mirror, a direction for a usual usage is often defined, and it is difficult for the device to radiate light in an arbitrary direction when used as an illumination device.

The present application has been made in view of the above-mentioned problem, and therefore provides a vehicle onboard display device that can also be used as an illumination device capable of radiating light in an arbitrary direction.

In order to solve the above-mentioned problem, according to one embodiment of the present application, there is provided a vehicle onboard display device to be installed on a vehicle, the vehicle onboard display device including: a display panel configured to display an image; a movable mechanism configured to change a direction of the display panel; a detection unit configured to detect a predetermined operation by a user; and a control unit configured to cause, when the detection unit detects the predetermined operation, the movable mechanism to operate so as to direct the display panel toward a predetermined direction, and cause the display panel to display an image at a predetermined brightness.

In the vehicle onboard display device according to the one embodiment of the present application: the detection unit may be a detection sensor configured to detect a location of the user; and the control unit may be configured to cause, when the user is detected by the detection sensor, the movable mechanism to operate so as to direct the display panel toward the detected user.

In the vehicle onboard display device according to the one embodiment of the present application: the detection unit may be a detection sensor configured to detect a state of a lock on a door of the vehicle; and the control unit may be configured to cause, when unlocking of the lock is detected by the detection sensor, the movable mechanism to operate so as to direct the display panel toward a driver's seat.

In the vehicle onboard display device according to the one embodiment of the present application: the detection unit may be a detection sensor configured to detect an open state and a closed state of a door of the vehicle; and the control unit may be configured to cause, when the open state of the door is detected by the detection sensor, the movable mechanism to operate so as to direct the display panel toward the opened door.

In the vehicle onboard display device according to the one embodiment of the present application: the detection unit may be a detection sensor configured to detect an illuminance outside the vehicle; and the control unit may be configured to cause, when the detected illuminance satisfies a predetermined condition, the display panel to display the image at the predetermined brightness.

In the vehicle onboard display device according to the one embodiment of the present application, the control unit may be configured to change the brightness of the image to be displayed on the display panel depending on the detected illuminance.

In the vehicle onboard display device according to the one embodiment of the present application, the brightness of the image and the direction of the display panel when the detection unit detects the predetermined operation may be able to be arbitrarily set for each user using the vehicle.

In the vehicle onboard display device according to the one embodiment of the present application: the vehicle onboard display device may have a first mode corresponding to an attitude of the display panel when the user drives the vehicle and a second mode corresponding to an attitude different from the attitude of the display panel in the first mode; and the control unit may be configured to set, when the detection unit detects the predetermined operation, the display panel to the attitude in the second mode.

The vehicle onboard display device according to the one embodiment of the present application may further include a measurement unit configured to measure a period elapsed after the detection unit detects the predetermined operation. In the vehicle onboard display device, the control unit may be configured to switch, when the measured period exceeds a predetermined threshold, the display panel from the attitude in the second mode to the attitude in the first mode.

In the vehicle onboard display device according to the one embodiment of the present application, the vehicle onboard display device may be configured to function as one of an image display device and a mirror in the first mode, and function as an illumination device in the second mode.

The vehicle onboard display device according to the one embodiment of the present application may further include a backlight configured to irradiate the display panel with light. In the vehicle onboard display device, the control unit may be configured to set, in the second mode, a brightness of the backlight to be higher than the brightness of the backlight in the first mode.

In the vehicle onboard display device according to the one embodiment of the present application, the image may include a monochromatic image or a pattern image with a plurality of colors.

BRIEF DESCRIPTION OF THE DRAWINGS

FIG. 3 is a diagram for illustrating an example of an operation condition table according to the embodiment.

FIG. 4 is a diagram for illustrating an example of a display setting table according to the embodiment.

FIG. 7 is a diagram for illustrating an example of user information according to the embodiment.

DETAILED DESCRIPTION

Now, an embodiment of the present application is described with reference to the accompanying drawings. Note that, in the figures, the same components or equivalent components are denoted by the same reference symbols, and duplicate descriptions thereof are omitted.

Figure 1:
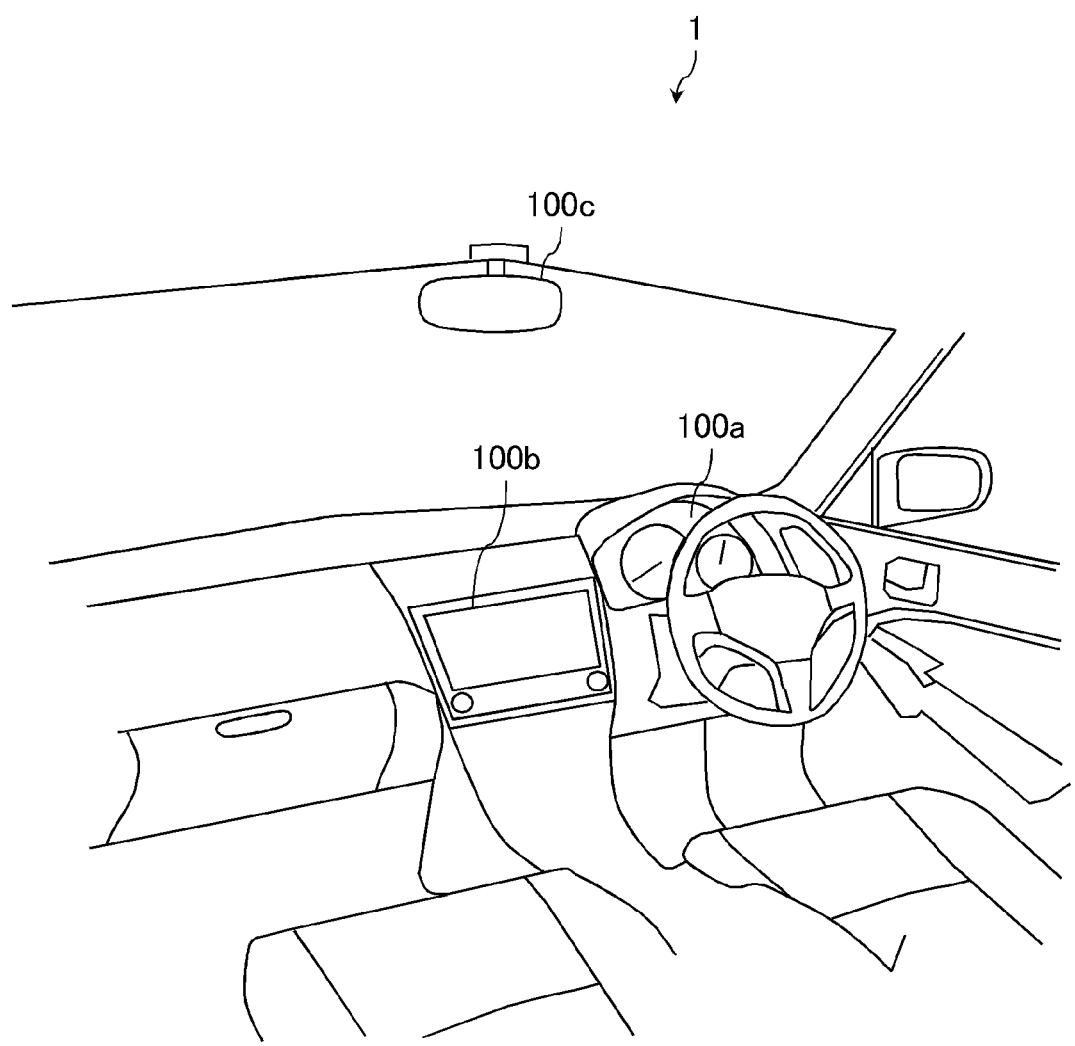
FIG. 1 is a diagram for illustrating an example of a vehicle on which a vehicle onboard display device according to an embodiment of the present application is installed.

FIG. 1 is a diagram for illustrating an example of a vehicle 1 on which vehicle onboard display devices 100 according to this embodiment are installed. On an instrument panel of the vehicle 1, vehicle onboard display devices 100a and 100b are installed. The vehicle onboard display device 100a is a meter display device configured to present various types of vehicle information (such as a speed and a temperature) to a user. The vehicle onboard display device 100b is a navigation device configured to provide the user with a navigation guidance. On a top portion of a windshield in a cabin of the vehicle 1, a vehicle onboard display device 100c is installed. The vehicle onboard display device 100c is an electronic mirror configured to function as a room mirror such as a rearview mirror. The vehicle onboard display device 100c may be an electronic mirror configured to function as an exterior mirror such as a side mirror installed outside the vehicle 1. The vehicle onboard display device 100c displays a mirror image constructed by images acquired by imaging a rear of the vehicle and sides of the vehicle. The vehicle onboard display device 100c may be installed in place of or additionally to related-art rearview mirror and side mirrors. Note that, a shape, an installed location, and the number of the vehicle onboard display devices 100 are not limited to those of the example illustrated in FIG. 1.

The vehicle onboard display device 100 according to this embodiment is configured so that a direction of a display surface thereof can be changed. For example, the display surface of the vehicle onboard display device 100 directs toward the feet of the user when the user gets in or out of the vehicle 1, and is caused to display an image at a predetermined brightness so that the vehicle onboard display device 100 functions as an illumination device. Particularly, an effect as the illumination device is increased by radiating monochromatic light at a predetermined brightness from the display surface of the vehicle onboard display device 100. In this way, the vehicle onboard display device 100 according to this embodiment has a feature of functioning not only as the usual display device, but also as the illumination device capable of radiating the light in an arbitrary direction. A detailed description is now given of a configuration of the vehicle onboard display device 100 according to this embodiment. The description is given of a case in which when the vehicle onboard display device 100 functions as the illumination device, monochromatic light is radiated from the display surface of the vehicle onboard display device 100 as an example.

Figure 2:
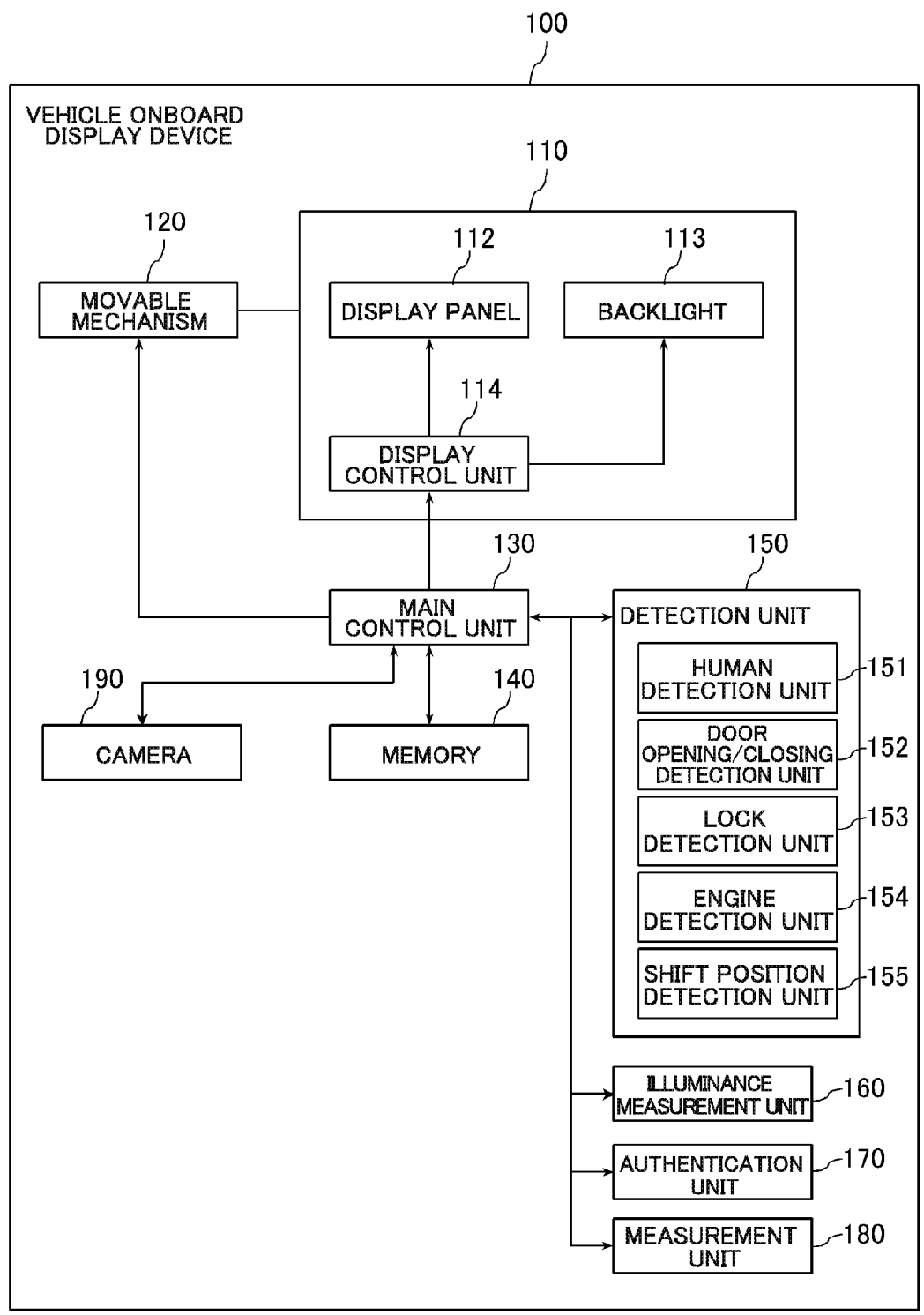
FIG. 2 is a block diagram for illustrating a configuration of the vehicle onboard display device according to the embodiment.

FIG. 2 is a block diagram for illustrating a configuration of the vehicle onboard display device 100 according to this embodiment. As illustrated in FIG. 2, the vehicle onboard display device 100 according to this embodiment includes a display unit 110, a movable mechanism 120, a main control unit 130, a memory 140, a detection unit 150, an illuminance measurement unit 160, an authentication unit 170, a measurement unit 180, and a camera 190.

The display unit 110 includes a display panel 112, a backlight 113, and a display control unit 114. The display panel 112 is constructed by a display device such as a liquid crystal panel or an organic EL panel, and is configured to display an image based on the control of the display control unit 114 and radiate the monochromatic light. The image may include a monochromatic image or a pattern image with a plurality of colors. On a back surface side of the display panel 112, the backlight 113 configured to irradiate the display panel 112 with light is installed. The display control unit 114 is configured to control the display panel 112 and the backlight 113 based on instructions of the main control unit 130.

The movable mechanism 120 includes an actuator, and is configured to move the display unit 110 based on the control of the main control unit 130, thereby arbitrarily changing an attitude of the display panel 112. As a result, the direction of the display surface of the display panel 112 can be changed to a predetermined direction.

The main control unit 130 includes a program control device such as a CPU, and is configured to carry out various types of information processing based on a program stored in the memory 140. In this embodiment, the main control unit 130 causes, when the detection unit 150 detects a predetermined operation by the user, the movable mechanism 120 to operate so that the display panel 112 directs toward the predetermined direction, and causes the display panel 112 to radiate the monochromatic light at a predetermined brightness via the display control unit 114. Moreover, the main control unit 130 is configured to control the brightness of the light radiated from the backlight 113 via the display control unit 114.

On this occasion, the predetermined operation by the user according to this embodiment includes a first operation and a second operation. Moreover, a function of the vehicle onboard display device 100 according to this embodiment includes a first mode corresponding to the first operation and a second mode corresponding to the second operation. In other words, when the first operation of the user is detected, the vehicle onboard display device 100 functions in the first mode, and when the second operation of the user is detected, the vehicle onboard display device 100 functions in the second mode. According to this embodiment, the first mode corresponds to an attitude of the display panel 112 when the user is driving the vehicle 1, and the second mode corresponds to an attitude different from the attitude of the display panel 112 corresponding to the first mode. Specifically, the second mode corresponds to an attitude of the display panel 112 when the user requires the illumination (for example, when the user gets in the vehicle 1 or gets out of the vehicle 1). Moreover, the first operation is an operation of the user to start the drive of the vehicle 1 such as starting an engine and shifting a shift position to a drive range or a reverse range. When the detection unit 150 detects the above-mentioned first operation, it is determined that the user starts the drive of the vehicle 1, and the vehicle onboard display device 100 thus functions in the first mode. In other words, the main control unit 130 causes the movable mechanism 120 to operate so as to set the display panel 112 to the attitude in the first mode, and causes the display panel 112 to display a usual image to be presented to the user as a display device so that the vehicle onboard display device 100 functions as the usual display device (the meter display device, the navigation device, or the electronic mirror). The second operation is an operation when the user requires illumination, for example, when the user approaches a door of the vehicle 1 to get in or out of the vehicle 1, when the hand of the user touches a door knob, when the user unlocks the vehicle 1, and when the user opens the door of the vehicle 1. When the detection unit 150 detects the above-mentioned second operation, the vehicle onboard display device 100 functions in the second mode. In other words, the main control unit 130 causes the movable mechanism 120 to operate so as to set the display panel 112 to the attitude in the second mode, and causes the display panel 112 to display monochromatic light at the predetermined brightness so that the vehicle onboard display device 100 functions as the illumination device. In this way, in the first mode, the vehicle onboard display device 100 functions as the usual display device (such as the meter display device, the navigation device, or the electronic mirror), and, in the second mode, the vehicle onboard display device 100 functions as the illumination device.

The memory 140 includes memory devices such as a RAM and a ROM, and is configured to store the programs executed by the main control unit 130 and the like.

The detection unit 150 includes various detection sensors, and is configured to output detection information detected by the detection sensors to the main control unit 130. The detection information according to this embodiment is information representing the detection of the first operation and the second operation of the user. The detection unit 150 according to this embodiment includes, for example, a human detection unit 151 configured to detect a location of the user, a lock detection unit 153 configured to detect a locked state and an unlocked state of the lock on the door of the vehicle 1, a door opening/closing detection unit 152 configured to detect an open state and a closed state of the door of the vehicle 1, an engine detection unit 154 configured to detect a start and a stop of the engine, and a shift position detection unit 155 configured to detect a shift position.

The human detection unit 151 is, for example, an infrared sensor or a contact sensor, and is configured to detect the location of the user. According to this embodiment, the human detection unit 151 detects an approach of the user to the vehicle 1 and a contact of the user to the vehicle 1. Moreover, the user approaching the vehicle 1 can be detected by using an image pickup element such as a CCD image sensor to image a periphery of the vehicle 1.

The lock detection unit 153 includes a switch configured to detect the state of the lock of the door of the vehicle 1, and is configured to detect the locked state and the unlocked state of the door of the vehicle 1. The lock detection unit 153 may detect the locked state and the unlocked state of the door of the vehicle 1 by means of a physical key operation, or may detect the locked state and the unlocked state of the door of the vehicle 1 by means of the key-less system.

The door opening/closing detection unit 152 includes a switch configured to detect the open state and the closed state of the door in the vehicle 1, and is configured to detect the open state and the closed state of the door of the vehicle 1. The door opening/closing detection unit 152 may be configured to detect not only the open state and the closed state of the door to the driver's seat, but also the open state and the closed state of each of a plurality of doors provided for the vehicle 1.

The engine detection unit 154 includes a switch configured to detect the start and the stop of the engine, and is configured to detect the start and the stop of the engine of the vehicle 1.

The shift position detection unit 155 includes a switch configured to detect the shift position of the vehicle 1, and is configured to detect which position of a parking range (P range), a reverse range (R range), a neutral range (N range), and a drive range (D range), the current shift position of the vehicle 1 is located at. Note that, the drive range includes an L range, a D1 range, a D2 range, and an S range.

The illuminance measurement unit 160 includes an illuminance sensor, and is configured to measure an illuminance outside the vehicle 1. For example, the main control unit 130 can acquire information representing the illuminance outside the vehicle 1 measured by the illuminance measurement unit 160, and, when the illuminance outside the vehicle 1 satisfies a predetermined condition, can cause the vehicle onboard display device 100 to operate in the second mode. Specifically, when the illuminance outside the vehicle 1 is low, the vehicle onboard display device 100 is caused to operate as the illumination device, and when the illuminance outside the vehicle 1 is high, the vehicle onboard display device 100 is not caused to operate as the illumination device. Moreover, the main control unit 130 can acquire information representing the illuminance outside the vehicle 1 measured by the illuminance measurement unit 160, and can change a color of the monochromatic light, the brightness of the monochromatic light, and a backlight brightness in the second mode depending on the illuminance outside the vehicle 1. Specifically, the main control unit 130 increases the brightness of the monochromatic light as the illuminance outside the vehicle 1 increases, and decreases the brightness of the monochromatic light as the illuminance outside the vehicle 1 decreases.

The authentication unit 170 is configured to authenticate a user using the vehicle 1 based on an instruction of the main control unit 130. The authentication unit 170 is configured to authenticate the user by means of a biometric authentication such as a fingerprint authentication, a face authentication, and a voice authentication. Moreover, a key used by the user and user information may be associated with each other in advance, and the authentication unit 170 may authenticate the user based on the used key. Moreover, the authentication unit 170 may prompt the user to enter authentication information such as an ID and a password, thereby authenticating the user. Note that, the authentication information for authenticating the user is assumed to be stored in the memory 140 in advance.

The measurement unit 180 is a timer, and is configured to measure various elapsed periods based on the control of the main control unit 130. The measurement unit 180 is configured to measure, for example, an elapsed period after the detection unit 150 detects the predetermined operation. For example, when the elapsed period after the second operation is detected exceeds a predetermined threshold, the main control unit 130 can switch the function of the vehicle onboard display device 100 from the second mode to the first mode.

The camera 190 is a digital camera configured to generate an image of, for example, a taken object. The camera 190 according to this embodiment may be a camera configured to take a mirror image to be displayed on the vehicle onboard display device 100c, a camera configured to image the periphery of the vehicle 1 for the human detection unit 151 to detect the user, or a camera configured to image the face of the user for the authentication of the user by the authentication unit 170. Note that, a plurality of cameras 190 may be provided for the vehicle onboard display devices 100 depending on usages.

According to this embodiment, the memory 140 is configured to store an operation condition table for storing operation conditions for respectively detecting the first operation and the second operation of the user, and a display setting table for storing display settings respectively for the first mode and the second mode of the vehicle onboard display device 100.

FIG. 3 is a diagram for illustrating an example of the operation condition table according to this embodiment. As illustrated in FIG. 3, the operation condition table stores the operation conditions for detecting the first operation of the user and the operation conditions for detecting the second operation of the user. As described before, the first operation is an operation of the user to start the drive of the vehicle 1, and, in FIG. 3, such a state that the start of the engine, the shift of the shift position to the drive range, and the shift of the shift position to the reverse range are stored as the operation conditions is illustrated. As described before, the second operation is an operation when the user requires the illumination, and is defined herein as operations of the user to get in the vehicle 1 or to get out of the vehicle 1. In FIG. 3, such a state that the unlocking, the opening of the door, and the approach of the user are stored as the operation conditions is illustrated. For each of the first operation and the second operation, at least one operation condition only needs to beset. Moreover, for the second operation, operation conditions for getting in the vehicle 1 and operation conditions for getting out of the vehicle 1 may be distinguished from each other. Moreover, the operation conditions for the first operation and the second operation can be arbitrarily set by the user. Note that, the second operation is not limited to the operations of the user to get in the vehicle 1 or to get out of the vehicle 1, and may be, for example, operations of the user to carry out operations in the vehicle 1. In this case, the operation conditions for the second operation may be, for example, the shift of the shift position to the parking range and the stop of the engine.

FIG. 4 is a diagram for illustrating an example of the display setting table according to this embodiment. As illustrated in FIG. 4, the display setting table stores, for each of the first mode and the second mode, the attitude of the display panel 112, the color of the monochromatic light radiated from the display panel 112, the brightness of the monochromatic light radiated from the display panel 112, and the brightness of the backlight 113.

The attitude of the display panel 112 in the first mode is set, for example, to a value (x0,y0,z0) (reference angle) representing an initial position. The value representing the attitude of the display panel 112 is a value representing a direction toward which a display surface of the display panel 112 directs, and is, for example, the normal direction of the display panel 112. For example, the initial position of the display panel 112 of the vehicle onboard display device 100*a* (meter display device) is a position directing toward the front of the driver's seat. Moreover, the initial position of the display panel 112 of the vehicle onboard display device 100*b* (navigation device) is a position directing toward a directly rear of the vehicle. Moreover, the initial position of the display panel 112 of the vehicle onboard display device 100*c* (electronic mirror) is a position directing slightly toward the driver's seat with respect to the directly rear of the vehicle (position usually set by the user for the driving). In the first mode, an image corresponding to the usual function of each of the vehicle onboard display devices 100 is displayed on the display panel 112, and the color of the monochromatic light, the brightness of the monochromatic light, and the brightness of the backlight are thus not set.

The attitude of the display panel 112 in the second mode is set to a predetermined angle with respect to the direction (reference angle) of the display surface of the display panel 112 in the first mode. The attitude of the display panel 112 in the second mode is set, for example, to a value at which the display surface of the display panel 112 directs toward a foot of the driver's seat or a value at which the display surface of the display panel 112 directs toward the entire cabin. Note that, the attitude of the display panel 112 in the second mode may not be fixed to a predetermined position, but may follow the motion of the user. Specifically, when the human detection unit 151 detects the user, the main control unit 130 can cause the movable mechanism 120 to operate so that the display panel 112 directs toward the detected user. Moreover, when the door opening/closing detection unit 152 detects the opening of the door, the main control unit 130 can cause the movable mechanism 120 to operate so that the display panel 112 directs toward the opened door. The color of the monochromatic light radiated from the display panel 112 is set, for example, to white, and the brightness of the monochromatic light radiated from the display panel 112 is set, for example, to the maximum brightness. The backlight brightness is set, for example, to the maximum brightness. In the second mode, the vehicle onboard display device 100 operates as the illumination device. Therefore, the brightness of the monochromatic light and the backlight brightness in the second mode are desired to be higher than the brightness of the backlight when the vehicle onboard display device 100 causes the display panel to display an image in the first mode. These display settings can be arbitrarily made by the user. Moreover, these display settings may be different from one another respectively for the plurality of vehicle onboard display devices 100 (vehicle onboard display devices 100*a*, 100*b*, and 100*c*). Note that, when a multicolor image is displayed on the vehicle onboard display device 100 in the second mode, a type of the image to be displayed may be set.

Figure 5:
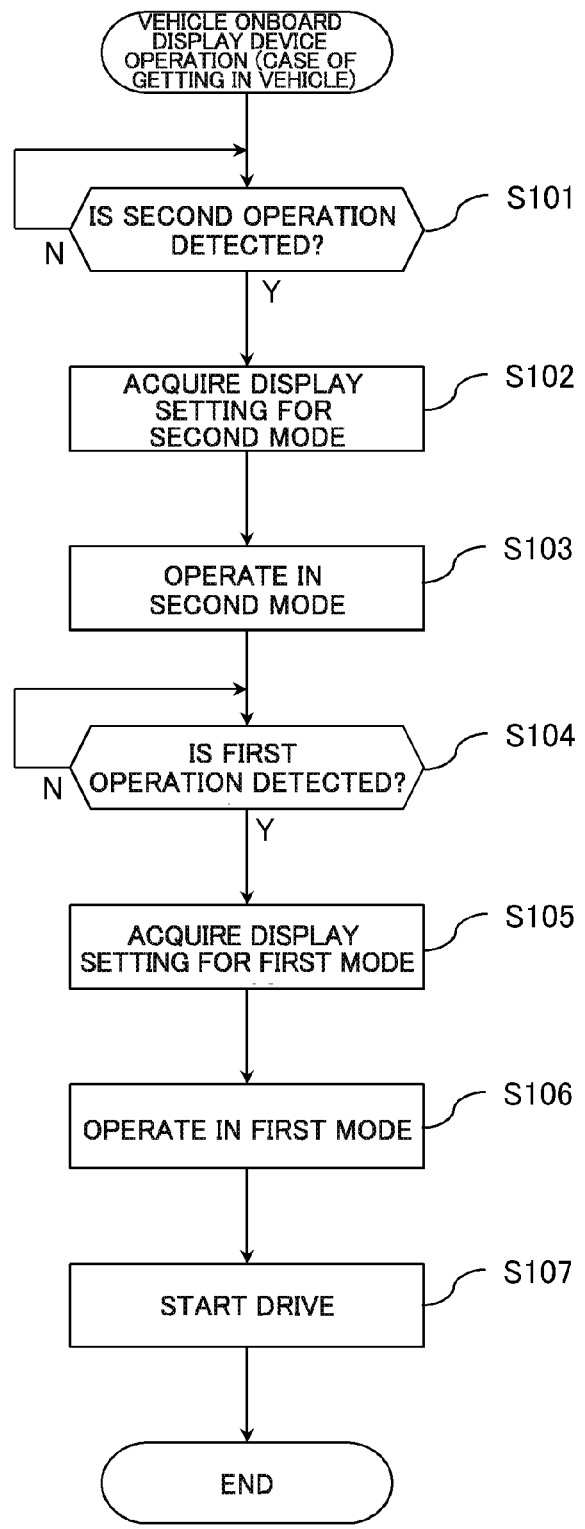
FIG. 5 is a diagram for illustrating a flow of an operation of the vehicle onboard display device when a user gets in the vehicle.
Figure 6:
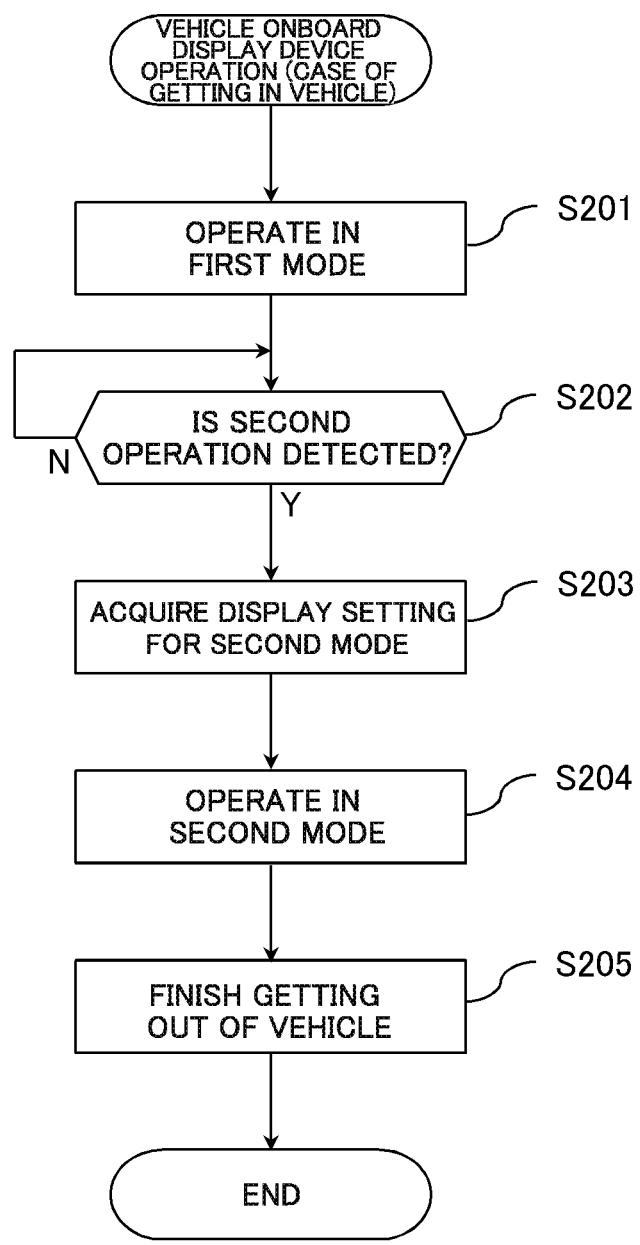
FIG. 6 is a diagram for illustrating a flow of an operation of the vehicle onboard display device when the user gets out of the vehicle.

Referring to flow charts of FIG. 5 and FIG. 6, a description is now given of a flow of the operation of the vehicle onboard display device 100 according to this embodiment. FIG. 5 is a diagram for illustrating a flow of the operation of the vehicle onboard display device 100 when the user gets in the vehicle 1. FIG. 6 is a diagram for illustrating a flow of the operation of the vehicle onboard display device 100 when the user gets out of the vehicle 1.

First, a description is given of the operation of the vehicle onboard display device 100 when the user gets in the vehicle 1. As illustrated in FIG. 5, when the user gets in the vehicle 1, the detection unit 150 monitors the state of the vehicle 1 (S101). On this occasion, it is determined whether or not the detection unit 150 detects the second operation stored in the operation condition table.

When the detection unit 150 detects the second operation in Step S101, the main control unit 130 acquires the display setting for the second mode from the display setting table stored in the memory 140 (S102).

Then, the main control unit 130 causes the vehicle onboard display device 100 to operate in the second mode based on the display setting for the second mode (S103). Specifically, the main control unit 130 causes the movable mechanism 120 and the display unit 110 to operate based on the display setting for the second mode. As a result, the vehicle onboard display device 100 can operate as the illumination device configured to radiate the monochromatic light in the desired direction when the user gets in the vehicle 1.

Then, while the vehicle onboard display device 100 is operating in the second mode, the detection unit 150 monitors the state of the vehicle 1 (S104). On this occasion, it is determined whether or not the detection unit 150 detects the first operation stored in the operation condition table.

When the detection unit 150 detects the first operation in Step S104, the main control unit 130 acquires the display setting for the first mode from the display setting table stored in the memory 140 (S105).

Then, the main control unit 130 causes the vehicle onboard display device 100 to operate in the first mode based on the display setting for the first mode (S106). Specifically, the main control unit 130 causes the movable mechanism 120 and the display unit 110 to operate based on the display setting for the first mode.

When the vehicle onboard display device 100 operates in the first mode in Step S106, and the user starts the drive (S107), the operation of the vehicle onboard display device 100 when the user gets in the vehicle is finished. Subsequently, while the user is driving the vehicle 1, the vehicle onboard display device 100 operates as the usual display device.

A description is now given of the operation of the vehicle onboard display device 100 when the user gets out of the vehicle 1. As illustrated in FIG. 6, first, the vehicle onboard display device 100 is operating in the first mode (as the usual display device) (S201).

Then, while the vehicle onboard display device 100 is operating in the first mode, the detection unit 150 monitors the state of the vehicle 1 (S202). On this occasion, it is determined whether or not the detection unit 150 detects the second operation stored in the operation condition table.

When the detection unit 150 detects the second operation in Step S202, the main control unit 130 acquires the display setting for the second mode from the display setting table stored in the memory 140 (S203).

Then, the main control unit 130 causes the vehicle onboard display device 100 to operate in the second mode based on the display setting for the second mode (S204). Specifically, the main control unit 130 causes the movable mechanism 120 and the display unit 110 to operate based on the display setting for the second mode.

When the vehicle onboard display device 100 operates in the second mode in Step S204, and the user has then gotten out of the vehicle 1 (S205), the backlight 113 turns off, and the operation of the vehicle onboard display device 100 when the user gets out of the vehicle is finished. As a result, the vehicle onboard display device 100 can operate as the illumination device configured to radiate the monochromatic light in the desired direction when the user gets out of the vehicle 1. Note that, whether or not the user has gotten out of the vehicle may be determined by the locking or the closing of the door. Moreover, in Step S202, when an elapsed period after the detection of the second operation exceeds a predetermined threshold, it may be determined that the user has gotten out of the vehicle.

Note that, in the above-mentioned example, in Step S104 of FIG. 5, it is determined whether or not the detection unit 150 detects the first operation, but, in Step S104, the measurement unit 180 may determine whether or not an elapsed period after the detection of the second operation by the detection unit 150 exceeds a predetermined threshold. Then, when the measurement unit 180 determines that the elapsed period after the detection of the second operation by the detection unit 150 exceeds the predetermined threshold, the processing in Step S105 may be carried out. In other words, when the elapsed period after the second operation is detected exceeds the predetermined threshold, the main control unit 130 switches the display panel 112 from the attitude in the second mode to the attitude in the first mode. As a result, when the elapsed period after the second operation is detected exceeds the predetermined threshold, the main control unit 130 can switch the function of the vehicle onboard display device 100 from the second mode to the first mode.

Moreover, the operation conditions for the first operation, the operation conditions for the second operation, and the display settings for the respective modes may be set as user information for each user. FIG. 7 is a diagram for illustrating an example of the user information according to this embodiment. The user information illustrated in FIG. 7 is assumed to be stored in the memory 140. As illustrated in FIG. 7, in the user information, for each user, the authentication information and the operation conditions and the display settings in the respective modes are associated with each other. This user information may be used to carry out the operation processing of the vehicle onboard display device 100 illustrated in FIG. 5 and FIG. 6. For example, in Step S101, when the detection unit 150 detects the second operation, the authentication unit 170 may use the authentication information stored in the user information to carry out the user authentication. Then, the main control unit 130 may acquire the display settings associated with the authenticated user, and may cause the vehicle onboard display device 100 to operate in the first mode or the second mode based on the display settings. As a result, the vehicle onboard display device 100 can be caused to operate in the display settings suited to each user.

Moreover, the display panel 112 may be of a so-called normally white type that presents a white display screen when a voltage is not applied to liquid crystal. In this configuration, when the vehicle onboard display device 100 is in the second mode, the display control unit 114 does not drive the display panel 112, but can drive only the backlight 113, thereby causing the vehicle onboard display device 100 to operate as the illumination device. Thus, power consumption of the vehicle onboard display device 100 can be reduced.

While there have been described what are at present considered to be certain embodiments of the application, it will be understood that various modifications may be made thereto, and it is intended that the appended claims cover all such modifications as fall within the true spirit and scope of the invention.

What is claimed is:

1. A vehicle onboard display device to be installed on a vehicle, the vehicle onboard display device comprising:
    a display panel configured to display an image;
    a movable mechanism configured to change a direction of the display panel;
    a detection unit configured to detect a predetermined operation by a user; and
    a control unit configured to cause, when the detection unit detects the predetermined operation, the movable mechanism to operate so as to direct the display panel toward a predetermined direction, and cause the display panel to display an image at a predetermined brightness.

2. The vehicle onboard display device according to claim 1, wherein:

the detection unit comprises a detection sensor configured to detect a location of the user; and the control unit is configured to cause, when the user is detected by the detection sensor, the movable mechanism to operate so as to direct the display panel toward the detected user.

3. The vehicle onboard display device according to claim 1, wherein:

the detection unit comprises a detection sensor configured to detect a state of a lock on a door of the vehicle; and the control unit is configured to cause, when unlocking of the lock is detected by the detection sensor, the movable mechanism to operate so as to direct the display panel toward a driver's seat.

4. The vehicle onboard display device according to claim 1, wherein:

the detection unit comprises a detection sensor configured to detect an open state and a closed state of a door of the vehicle; and the control unit is configured to cause, when the open state of the door is detected by the detection sensor, the movable mechanism to operate so as to direct the display panel toward the opened door.

5. The vehicle onboard display device according to claim 1, wherein:

the detection unit comprises a detection sensor configured to detect an illuminance outside the vehicle; and the control unit is configured to cause, when the detected illuminance satisfies a predetermined condition, the display panel to display the image at the predetermined brightness.

6. The vehicle onboard display device according to claim 5, wherein the control unit is configured to change the brightness of the image to be displayed on the display panel depending on the detected illuminance.

7. The vehicle onboard display device according to claim 1, wherein the brightness of the image and the direction of the display panel when the detection unit detects the predetermined operation are able to be arbitrarily set for each user using the vehicle.

8. The vehicle onboard display device according to claim 1, wherein:

the vehicle onboard display device comprises a first mode corresponding to an attitude of the display panel when the user drives the vehicle and a second mode corresponding to an attitude different from the attitude of the display panel in the first mode; and the control unit is configured to set, when the detection unit detects the predetermined operation, the display panel to the attitude in the second mode.

9. The vehicle onboard display device according to claim 8, further comprising a measurement unit configured to measure a period elapsed after the detection unit detects the predetermined operation, wherein the control unit is configured to switch, when the measured period exceeds a predetermined threshold, the display panel from the attitude in the second mode to the attitude in the first mode.

10. The vehicle onboard display device according to claim 8, wherein the vehicle onboard display device is configured to function as one of an image display device and a mirror in the first mode, and function as an illumination device in the second mode.

11. The vehicle onboard display device according to claim 8, further comprising a backlight configured to irradiate the display panel with light, wherein the control unit is configured to set, in the second mode, a brightness of the backlight to be higher than the brightness of the backlight in the first mode.

12. The vehicle onboard display device according to claim 1, wherein the image includes a monochromatic image or a pattern image with a plurality of colors.

13. A vehicle onboard display device to be installed on a vehicle, the vehicle onboard display device comprising:

a display panel configured to display an image;

a movable mechanism configured to change a direction of the display panel;

a detection unit configured to detect a predetermined operation by a user;

a camera unit configured to take an image; and a control unit configured to cause, when the detection unit detects the predetermined operation, the movable mechanism to operate so as to direct the display panel toward a predetermined direction, and cause the display panel to display an image at a predetermined brightness, wherein:

the vehicle onboard display device comprises a first mode corresponding to an attitude of the display panel when the user drives the vehicle and a second mode corresponding to an attitude different from the attitude of the display panel in the first mode;

the control unit is configured to set, when the detection unit detects the predetermined operation, the display panel to the attitude in the second mode; and the vehicle onboard display device is configured to display the image taken on the camera unit in the first mode, and function as an illumination device in the second mode.

14. The vehicle onboard display device according to claim 13, wherein the movable mechanism is configured to change the direction of the display panel from the direction of the display panel in the first mode to the direction of the display panel in the second mode.

* * * * *